United States Patent
Kelly et al.

[11] Patent Number: 5,907,322
[45] Date of Patent: May 25, 1999

[54] TELEVISION EVENT MARKING SYSTEM

[75] Inventors: Gregory H. Kelly; Kenneth Y. Goldberg, both of San Francisco; John S. Gee, Auburn; Philip D. Levinson, Los Altos Hills; Scott Fullam, Mountain View, all of Calif.

[73] Assignee: Catch TV Acquisition Corp., Burlingame, Calif.

[21] Appl. No.: 08/731,525

[22] Filed: Oct. 16, 1996

[51] Int. Cl.$^6$ ............................................. H04N 7/16
[52] U.S. Cl. ...................... 345/327; 348/10; 348/734; 455/6.2
[58] Field of Search ..................... 348/906, 1, 6, 348/10, 11, 12, 13, 7, 734; 345/327; 455/4, 2, 5.1, 6.1, 6.2, 6.3; H04N 7/173

[56] References Cited

U.S. PATENT DOCUMENTS

| | | |
|---|---|---|
| 4,706,121 | 11/1987 | Young . |
| 5,438,355 | 8/1995 | Palmer ........................................... 348/1 |
| 5,444,499 | 8/1995 | Saitoh ....................................... 348/734 |
| 5,570,295 | 10/1996 | Isenberg et al. ..................... 364/514 R |
| 5,692,214 | 11/1997 | Levine ...................................... 348/906 |
| 5,694,163 | 12/1997 | Harrison ................................... 348/552 |
| 5,778,182 | 7/1998 | Cathey et al. ............................... 348/1 |

OTHER PUBLICATIONS

"Joining Television and the Internet Using Java", Internet Week, pp. 1–2, Apr. 1, 1996.

*Primary Examiner*—Chris Grant
*Attorney, Agent, or Firm*—Dennis & Irene Fernandez LLP

[57] ABSTRACT

A system for bookmarking viewer selected TV broadcast events and displaying a set of associated internet locations or website hotlinks, comprising the selection of a set of broadcast events using a remote control, and storing a set of event-identifier data associated with the set of selected broadcast events in an activity table, and then generating a set of associated internet locations or website hotlinks by comparing the set of event identifiers with a database of TV schedules, events and company information. The generated set of associated internet locations or website hotlinks can then be used by viewer for access to and display of the selected internet locations associated with the set of selected broadcast events.

10 Claims, 9 Drawing Sheets

TELEVISION EVENT MARKING SYSTEM

FIELD OF THE INVENTION

This invention relates to systems for navigating, marking and displaying viewer-selected television broadcast events and the on-line information and content associated with the selected broadcast events.

BACKGROUND OF THE INVENTION

As television (TV) viewers become more familiar with on-line services, such as the internet and the World Wide Web, they are demanding access to on-line information and content related to the TV content and TV-advertised companies and products. This information is becoming more readily available to the internet user. An increasing number of TV broadcasters, advertisers, and organizations have created their own internet locations (i.e., websites), and many have begun to display their web site address, (i.e., their Universal Resource Locator (URL) on TV ads and programs (broadcast events) to encourage viewers to access their website for more information. However, viewers typically cannot easily recall or identify an associated URL for a particular broadcast event because the broadcast URLs are typically displayed on TV for only a brief time and, in many cases, the relevant URL is not broadcast at all. A tool is needed to allow the viewer to easily access URLs, to immediately navigate to the desired URL, i.e., switch to the displayed website as if it were a TV channel, or to "bookmark" the broadcast event, i.e., to mark one or more broadcast TV events so the viewer can later recall these events and access all the websites associated with these events.

Familiar to most people, traditional bookmarks are those used to mark a page in a book to which the reader wants to later return. In the personal computer and World Wide Web environment, an analogous feature allows a typical net browser application running on the computer to "bookmark" web pages, i.e., select a button from a pull-down menu on the browser tool, allowing the user to store a URL associated with a website for rapid, one-step return access, without requiring the user to recall or re-enter the URL of that particular website. However, because there is no similar "bookmarking" tool that exists for viewers to use with their TVs, there is a resulting need for a user-friendly, automated system to "bookmark" TV broadcast events and the URLs associated with these events for subsequent viewer use. Additionally, once the events are bookmarked, it is also desirable to provide a system for viewers to easily retrieve and display the websites and website "hotlinks" (i.e., buttons programmed in hypertext markup language displayed on the internet that connect directly to specific websites) associated with these bookmarked events.

SUMMARY OF THE INVENTION

This invention describes a system for marking viewer-selected TV broadcast events by selecting a one or more broadcast events using a remote control, and storing a set of data associated with each selected broadcast events as an activity record (AR) in an activity table (AT). The activity table with the set of event identifiers is transmitted to an on-line database having information relating to TV program schedules, TV and Web advertisements information and related website hotlinks to thereby generate a set of associated network locations, such as websites and website hotlinks. The generated set of associated internet locations or website hotlinks can be used by the viewer for access to and display of the generated set of internet locations or websites associated with viewer selected broadcast events.

It is also envisioned that this invention also provides a system to allow viewer to customize in advance event viewing schedule and to automate TV display of, or recording to a VCR of, viewer selected events.

DETAILED DESCRIPTION OF THE INVENTION

Figure 1:
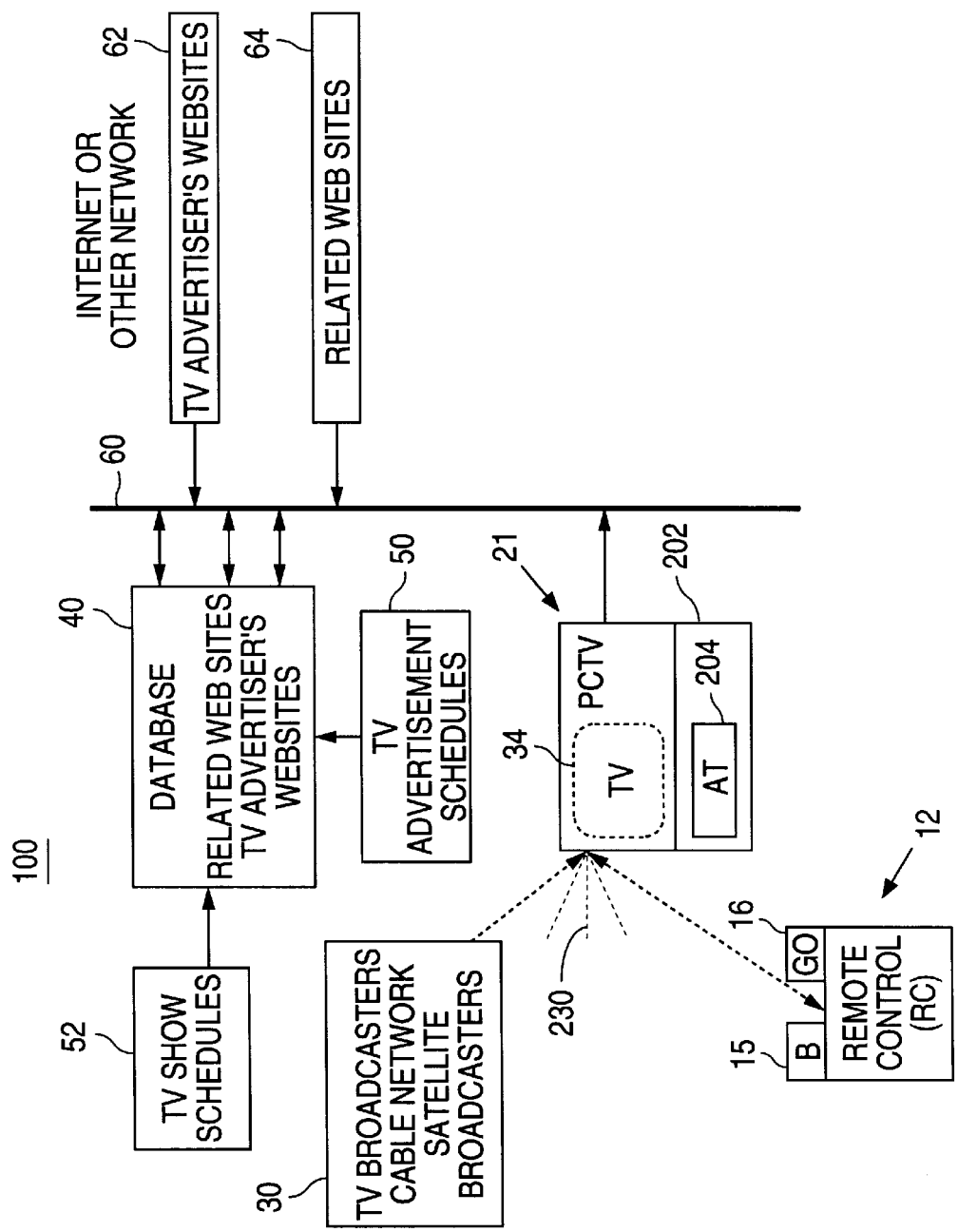
FIG. 1 illustrates a TV event marking system for marking viewer selected television events and displaying the associated internet hotlinks and locations corresponding with the selected events in accordance with the principles of this invention.

FIG. 1 illustrates an embodiment of a low cost TV event marking system 100 for marking viewer selected TV broadcast events so that associated information such as websites can be retrieved from an on-line service 60, such as the Internet, an intranet or other networks. In effect, this provides means to "bookmark" a televised event, marking that event for later recall, loosely analogous to placing a bookmark in a book to facilitate later recall. TV event marking system 100 allows a viewer to "bookmark" a set of selected TV events as they are broadcast, such as, but not limited to, a TV advertisement, a TV news broadcast, a TV educational or entertainment program, or a TV job training show. TV event marking system 100 stores the set of selected events into computer memory so that on-line data associated with these events can be retrieved from a central database. In system 100, the viewer can mark the specified broadcast event by activating a select button 15 on a remote control 12. In this example, select button 15 is labeled "B" on remote control 12 to denote "Bookmark". Each time the viewer activates select button 15 to bookmark a particular broadcast event, an activity record (AR) entry comprises data describing the date, time and channel is stored into an electronic memory 202. It is envisioned that TV event marking system 100 can also store an AR entry for each additional data relating to viewer preferences, such as for example, each time the channel is changed via remote control 12, and other remote control operations indicating viewing preferences. We refer to a list of AR entries as an activity table (AT) 204 that is stored in electronic memory 202.

Figure 4:
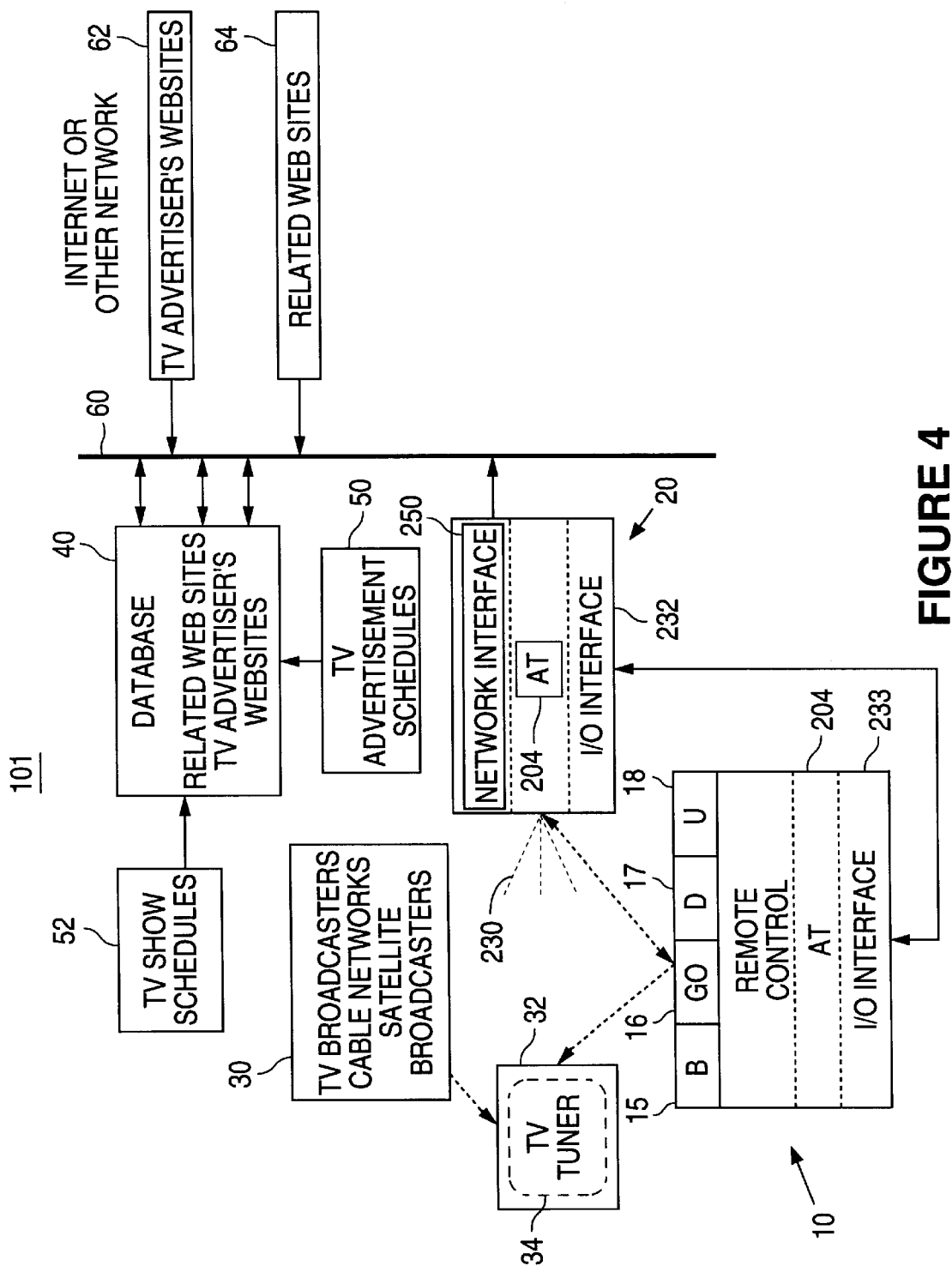
FIG. 4 illustrates an alternative embodiment of the TV event marking system of FIG. 1.

Once the viewer has completed marking a selection of broadcast events, AT 204 is stored into a network access device 21, whether in the resident memory inside network access device 21 coupled to a TV tuner 34, or in an alternative embodiment, in the resident memory of a personal computing device 20 (as in FIG. 4). When the viewer is ready to browse the websites associated with the selected broadcast events, either network access device 21, or personal computing device 20 of FIG. 4, transmits activity table 204 comprising the AR entries and also viewer identifying data, such as a particular demographic data, for example, the postal code of the viewer's location, via on-line service 60 to a central database 40. Database 40 comprises information compiled from various sources, such as TV advertisements schedules 50 associated with various TV shows, TV show schedules 52, TV advertisers' websites 62 and other websites topically related to broadcast content 64. AT 204 is then used to determine which data in the database 40 should be retrieved and presented to the viewer. For example, one of the AR entries in the AT might be (Sep. 1, 1996-19:30:32-CH7), indicating the date, time, and channel selected. This data, along with the viewer's regional information, is then compared to the TV advertisement schedule 50 in database 40 to determine the TV advertisements broadcast at the time of activating select button 15. Database 40 then generates a custom list of data for the user which indicates bookmarks associated with the broadcast event. For example, this list of data could take the form of, but not limited to, a World Wide Web (www) page on the Internet. The viewer could then view these with a generic www browser.

Figure 2:
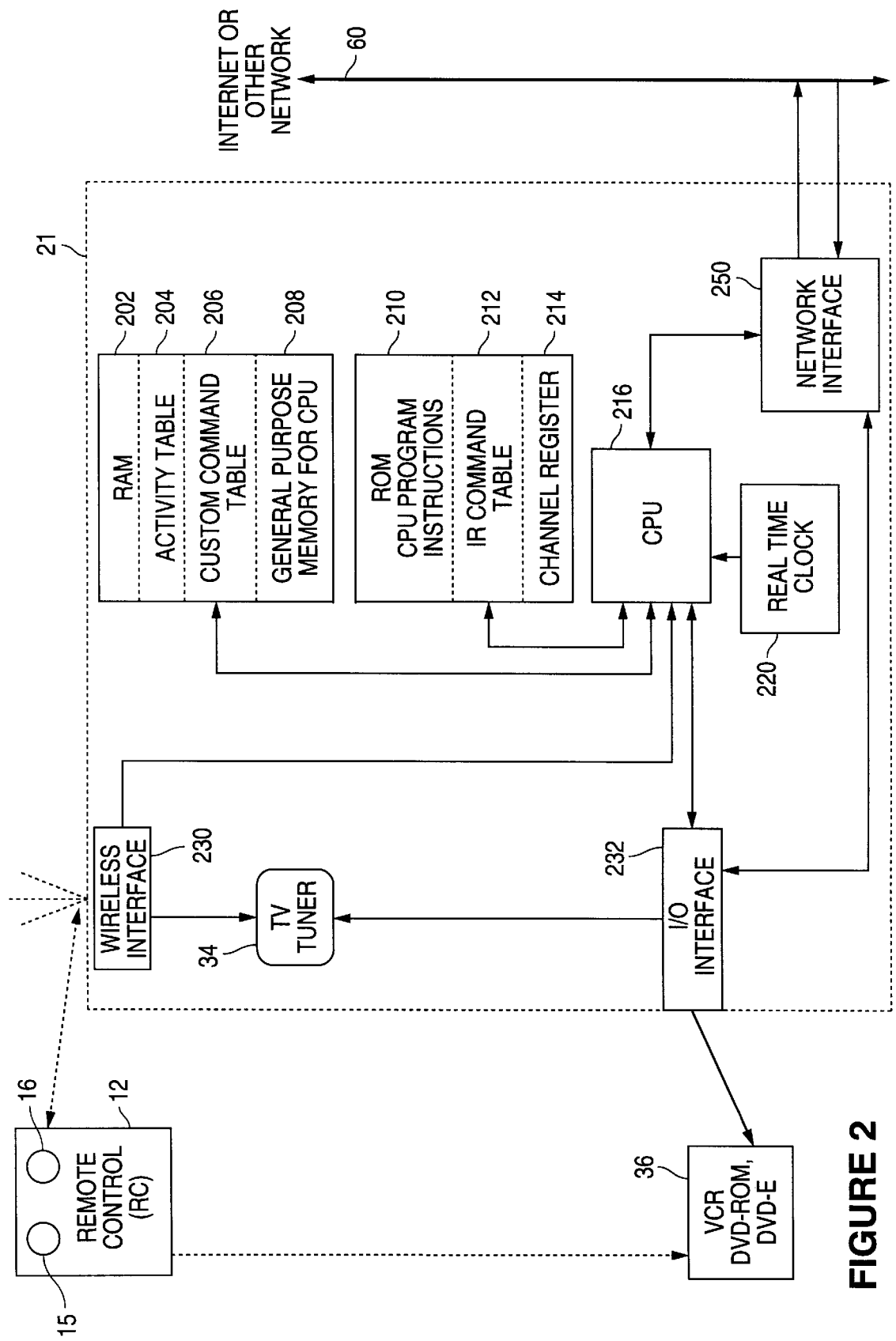
FIG. 2 illustrates a more detailed block diagram of the network access device shown in FIG. 1.

FIG. 2 shows a more detailed block diagram of network access device 21 such as a set-top box comprising a computer system coupled to a conventional TV tuner 34, or a specialized TV having computer processing capability (i.e., a PCTV), both having conventional network connection capabilities or other means for on-line access to the Internet or other networks 60. CPU 216 controls among other functions, a wireless interface 230, a custom command table 206, communications with external devices via an I/O interface 232. In the preferred embodiment, AT 204 is stored in electronic memory 202 inside network access device 21. When Bookmark button 15 is pressed, remote control 12 sends a wireless signal comprising a command to CPU 216 to store an AR entry into AT 204 inside network access device 21, thereby "bookmarking" the broadcast event for later lookup. It is also an objective of this invention that TV event marking system 100 can be programmed to automate custom display of, or to program a VCR to record viewer selected broadcasts according to viewer selected TV schedules and events of database 40, as is later described with FIGS. 6–9. It is further envisioned that the principles of this invention can also be used to mark radio broadcast.

Figure 3:
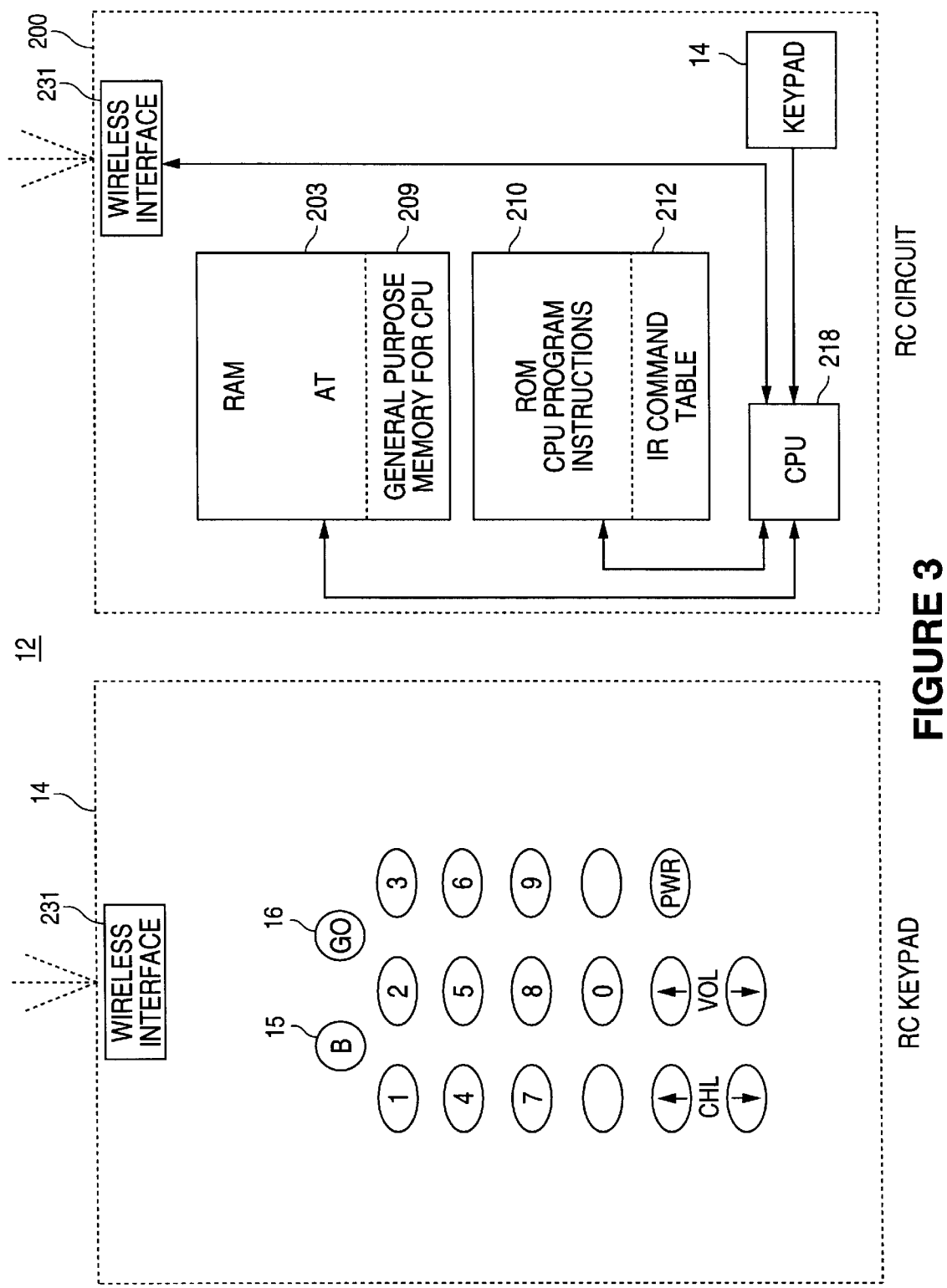
FIG. 3 illustrates a more detailed block diagram of the new remote control shown in FIG. 1.

FIG. 3 illustrates a more detailed block diagram of remote control 12. In the preferred embodiment, remote control 12 comprises a network access button 16 that interrupts a TV broadcast displayed on TV 34 and immediately display instead a selected associated website on TV 34. In this example, network button 16 is labeled "Go" to denote "Go to selected site". Each time the viewer activates network button 16, a request to view a particular website is initiated. Aside from the new features described herein, remote control 12 further comprises similar basic components and functions as in conventional remote controls, and thus it also provides the traditional operations of other conventional remote controls along with the event marking function buttons, such as provided by event selection button 15, (labeled here, for example, as "B" for "Bookmarking"), network access button 16 (labeled "Go"), and in an alternative embodiment shown in FIG. 5, further described below, download button 17 (labeled "D") and upload button (labeled "U"). It is understood that the labels provided herein for the function buttons on remote control 12 are merely examples in describing their respective embodiments and for ease of reference. It should be obvious that other labeling of function buttons 15–16 are envisioned as within the scope of this invention.

In operation, whenever the viewer activates event selection button 15 "B" on keypad 14 (FIG. 3), this activation contemporaneously triggers CPU 216 (FIG. 2) in network access device 21 to concurrently query real time clock 220 for the current date and time, and IR command table 212 for the current channel, in order to generate an AR to which it adds a flag indicating a "bookmark". The resulting activity record having a "bookmark" flag is then stored into AT 204 and, as an example, comprising information representative of:

Date-Time-Channel-Bookmark:

Sep. 1, 1996-19:30:32-7-B

It is also envisioned that TV event marking system 100 can also be used to provide data of user's viewing patterns, interests and preferences by generating an AR entry for each time the viewer changes channels via remote control 12. Whenever the viewer activates the change of channel button on remote control 12, the remote control sends to the TV, the VCR, etc., an infrared signal to change the channel, and also signals CPU 216 in network access device 21 to query real time clock circuit 220 for the current date and time, and also current channel register 214 for the current channel information. The resulting AR entry might comprise the following representative information:

Date-Time-Channel Change:

Sep. 1, 1996-19:30:32-CH7

Each change of channel by the viewer thereby produces a corresponding stored AR entry in AT 204, the collective data of various AT 204 from each viewer can be used to evaluate viewer preferences and viewing patterns.

The number of AR entries stored in AT 204 is limited only by the available memory space in memory storage 202 or attached storage device. AT 204 is organized in a first-in, first-out (FIFO) sequence. When the available memory is fill, the oldest ARs are deleted to accommodate the newest ARs. When the viewer wants to access the various websites associated with the selected broadcast events, the viewer activates network access button 16 ("Go") which causes peripheral device 21 to send the selected AT 204 to database 40, whereupon database 40 will return to network access device 21 the network address of the selected websites. Network access device 21 (FIG. 2) then processes the network address for the selected website and retrieve it for the viewer. Thus the viewer can access selected websites with a single button.

FIG. 4 shows an alternative embodiment of network access device 20, wherein the network access device need not be a set-top box, a PCTV, or a computer coupled to the TV for network access. In this embodiment, AT 204 is first stored in a remote control device 10 and later downloaded from remote control 10 to a personal computing device 20, such as a standard personal computer that can communicate with remote control 10 via a wireless interface 230 and/or a standard I/O interface 232. In this embodiment, personal computer 20 has a network connection or other means for on-line access to the Internet and other such networks 60. As shown in FIG. 4, network interface 250 for controlling the access to network 60 resides in PC 20, thereby eliminating the need for a TV to be coupled to a settop box or a personal computer.

In the alternative embodiment of TV event marking system 101 of FIG. 4, the viewer periodically transfers AT 204 from remote control 10 to peripheral device 20 via standard wireless interface 231 or standard I/O interface 233 on remote 10 when viewer download button 17 is activated by the viewer. In this example, download button 17 is labeled "D" on remote control 10 to denote "Download Activity Table to PC". Each time the viewer activates download button 17 to transfer AT 204 to remote control 10, AT 204 on personal computer 20 is thereby updated.

Figure 5:
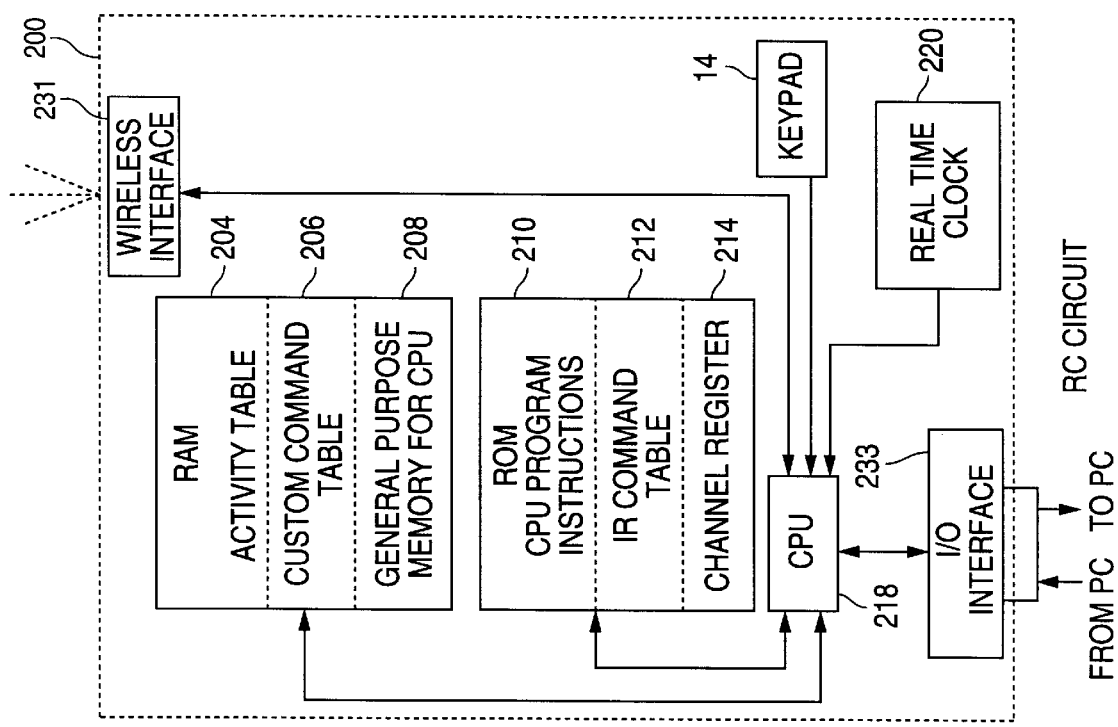
FIG. 5 illustrates a more detailed block diagram of the new remote control in the TV event marking system of FIG. 4.
Figure 5:
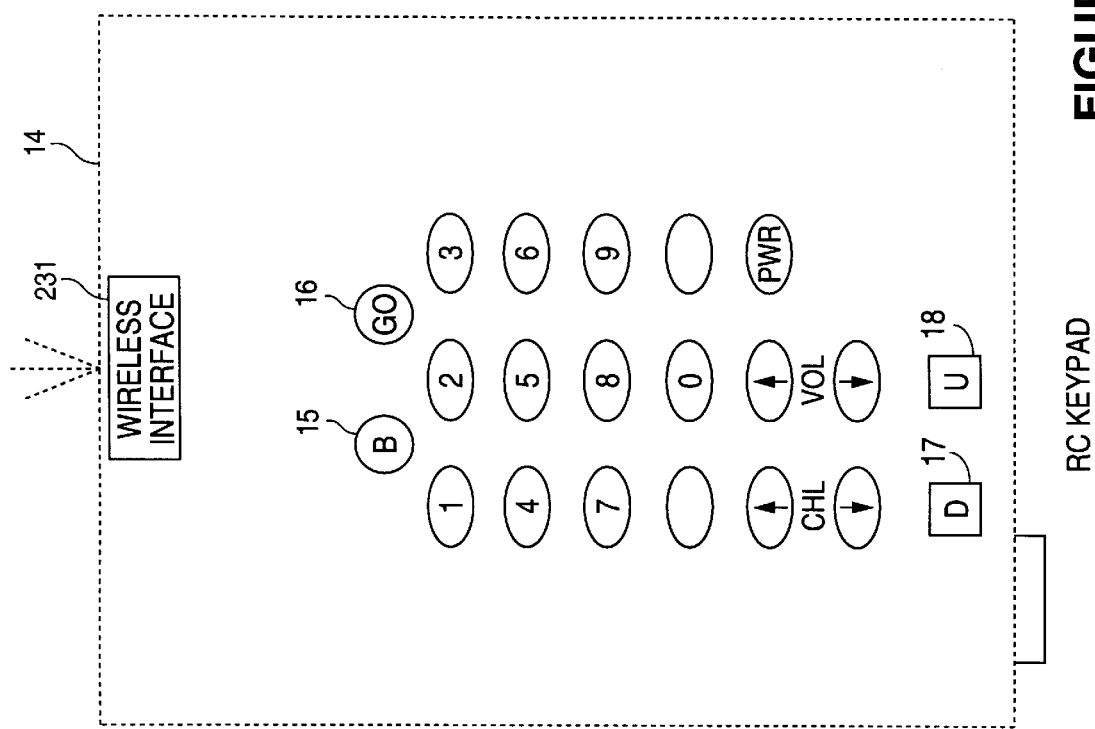

FIG. 5 illustrates a more detailed block diagram of remote control 10, described in accordance with the principles of this invention. Aside from the additional features described herein, remote control 10 further comprises similar basic components as in conventional remote controls and thus also provide the traditional operations of other conventional remote controls together with event marking function buttons, such as provided by, event selection button 15, (labeled here, for example, as "B" for "Bookmarking"), network access button 16 (labeled "Go"), download button 17 (labeled "D") and upload button (labeled "U"). Additionally, remote control 10 comprises a serial I/O interface 233 which is envisioned as an alternative means of interfacing remote control 10 to personal computing device 20. It is envisioned that remote control 10 may be manufactured with or without I/O interface 232.

In operation, whenever the viewer changes channels via remote control 10 by pressing the conventional channel change buttons, in addition to performing the function of sending to the TV set, VCR, etc. an infrared signal to change the channel, this action contemporaneously activates CPU 218 embedded in personal computing device 20 to concurrently query real time clock 220 for the current date and time, and current channel register 214 for the current channel, in order to generate an AR entry which is stored into AT 204. The resulting AR comprises:

Date-Time-Channel:

Sep. 1, 1996-19:30:32-CH7

Whenever the viewer activates the event selection button 15 on keypad 14, "bookmarking" a particular event, this activation contemporaneously triggers CPU 218 to concurrently query real time clock 220 for the current date and time, and an IR command table 212 for the current channel, in order to generate an AR to which it adds a flag indicating the "bookmark". IR command table 212 comprises stored infrared data that remote control 10 received via wireless interface circuit 231, such as from the TV tuner or personal computing device 20. The resulting AR entry is then stored into AT. The resulting AR entry with "bookmark" flag comprises the following information:

Date-Time-Channel-Bookmark Example:

Sep. 1, 1996-19:30:32-7-B

As described above in the preferred embodiment, AT 204 is organized in a FIFO sequence. Thus, when the available memory is full, the oldest ARs are deleted to accommodate the newest ARs. When the viewer wants to access the various websites associated with the selected broadcast events, the viewer then activates download button 17 to transfer stored AT 204 to personal computing device 20 via the wireless interface 231 or the I/O interface 233. When viewer activates network access button 16 ("Go"), personal computing device 20 transmits AT 204 to database 40, whereupon in response, database 40 transmits to personal computing device 20 the network address of the associated website correlating to viewer's selection. Personal computing device 20 will then process the network address to generate the selected website or website hotlinks for access by the viewer. Thus the viewer can access desired websites activating a single button, "GO".

Figure 6:
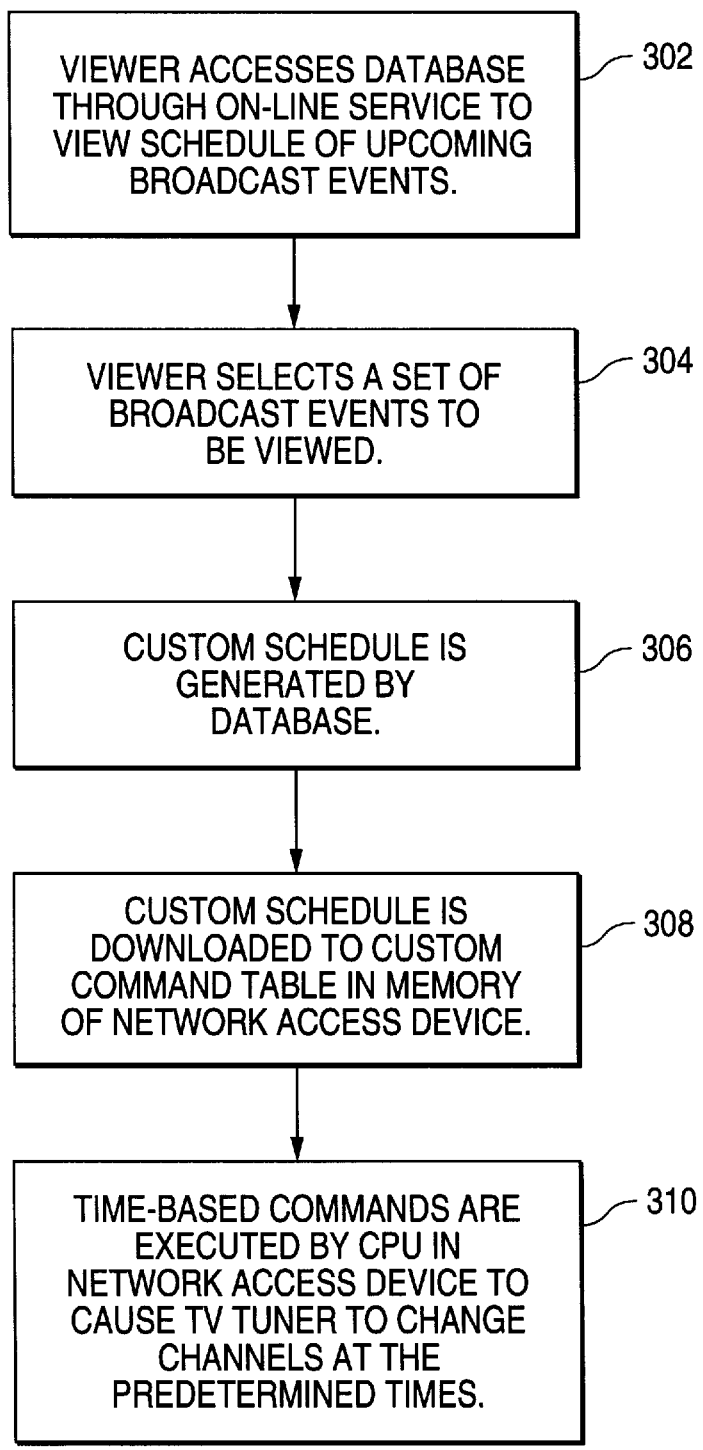
FIG. 6 illustrates an automated custom program scheduling and display method using TV event marking system of FIG. 1.

FIG. 6 illustrates an automated custom program scheduling method using TV event marking system 100 of FIG. 1. Automated custom program schedule method 300 accesses on-line broadcast event listings in database 40 to allow viewer to bookmark in advance selected scheduled broadcast events or websites for automated TV viewing. Automated custom scheduling method 300 comprises a first step 302 of accessing database 40 via network accessing device 20 to view scheduled broadcast events. Then, in step 304, viewer selects the set of broadcast events to be viewed. Once selection is completed, a corresponding custom schedule identifying selected the date, time and channel of all selected events is generated in step 306,. Then, in step 308, the custom schedule is downloaded to custom command table 206 (see also FIGS. 1) in memory 202 of network access device 21. The custom command table 206 comprising a time-based command sequence is then executed by CPU 216 in network access device 21 in step 310 to instruct TV tuner 34 to automatically change channels in a time sequence provided in custom command table 206. It is envisioned that remote controls 10 and 12 (FIG. 3 and 5) comprises bi-directional I/O port and thus can be remotely programmed by personal computer system 20 or network access device 21.

Figure 7:
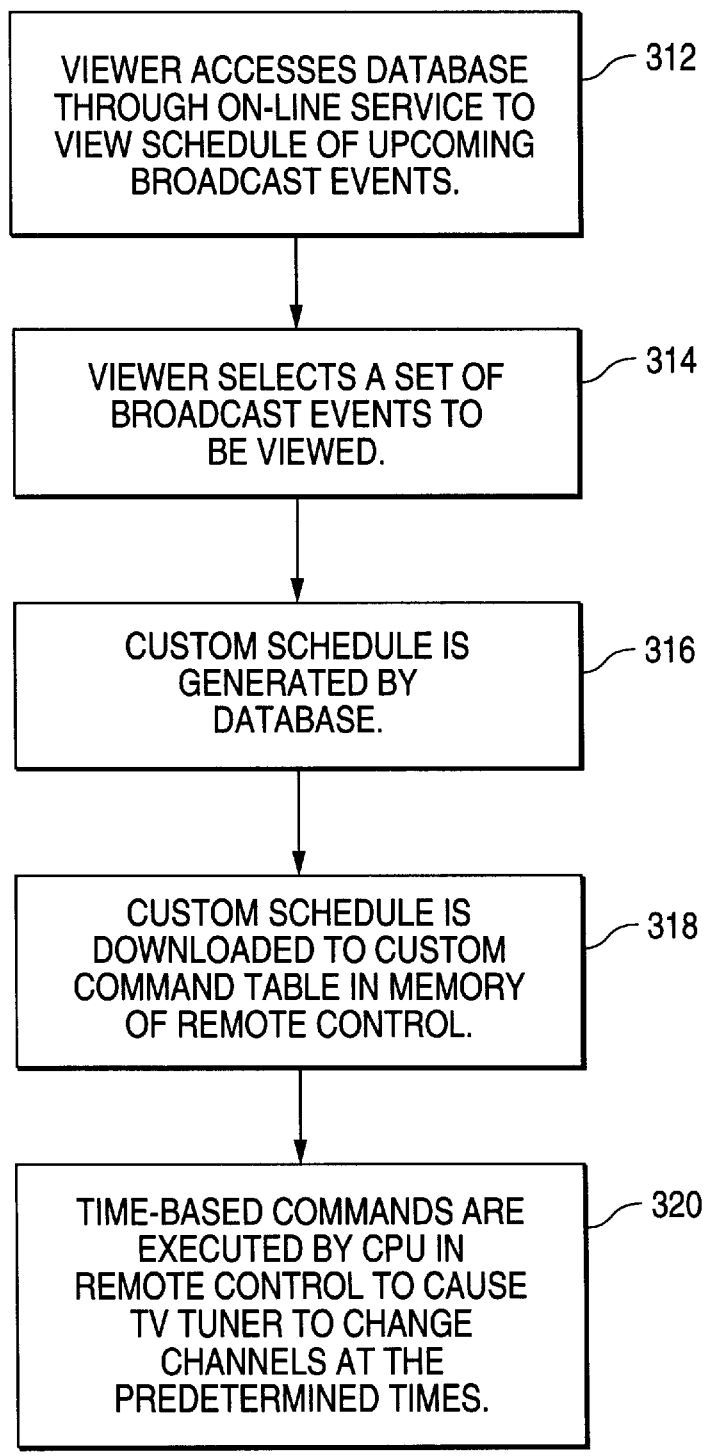
FIG. 7 illustrates an alternative embodiment of the automated custom program scheduling and display method using TV marking system of FIG. 4.

FIG. 7 shows an alternative embodiment of an automated custom program scheduling method using TV event marking system of FIG. 4. Thus, automated scheduling method 330 comprises a first step 312 of accessing on-line broadcast event listings in database 40 to allow viewer to bookmark in advance selected scheduled broadcast events or websites for automated TV viewing. Then, in step 314, viewer identifies the set of broadcast events to be viewed. Once selection is completed, a corresponding custom schedule identifying selected the date, time and channel of all selected events is generated in step 306. Then, in step 308, the custom schedule is downloaded to custom command table 206 in memory of remote control 10 (see FIG. 5). Custom command table 206 comprising a time-based command sequence is then executed by CPU 218 remote control 10 in step 310 to instruct TV tuner 34 to automatically change channels in a time sequence provided in custom command table 206.

Figure 8:
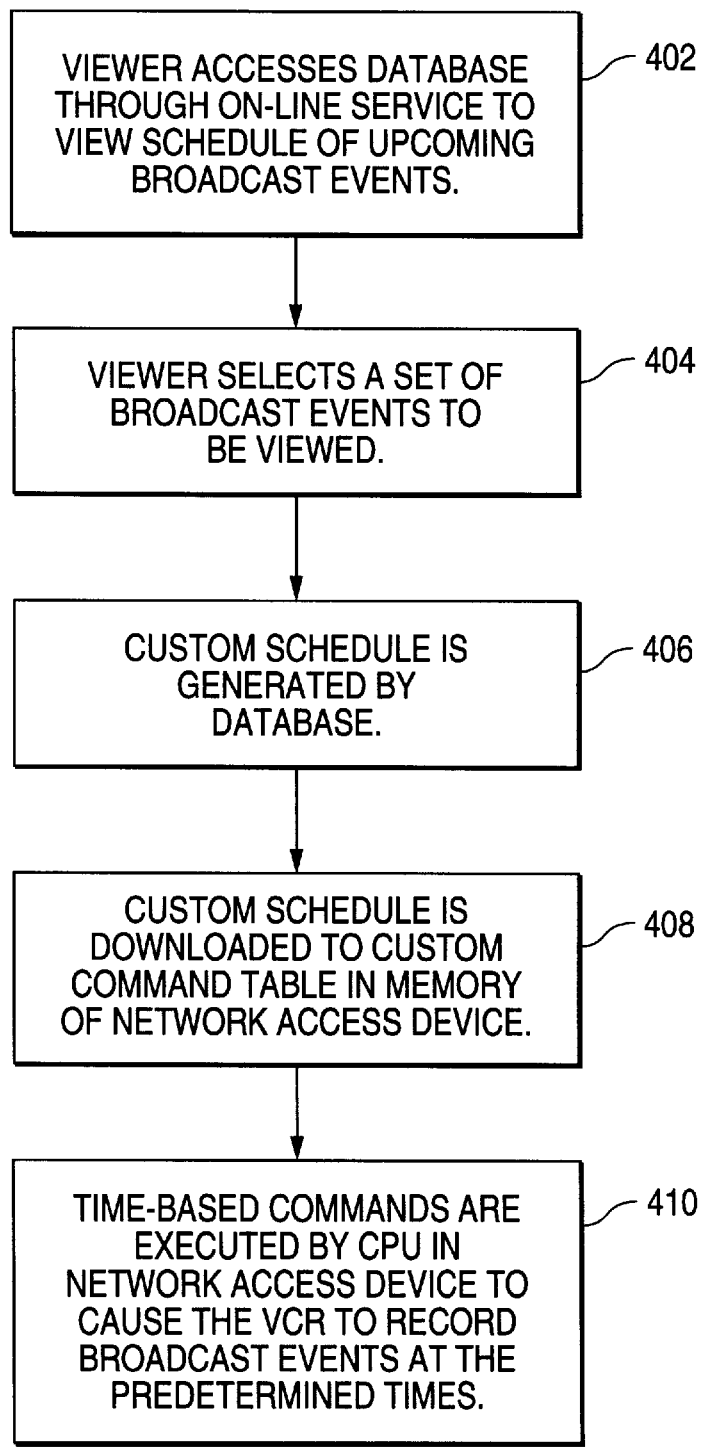
FIG. 8 illustrates an automated VCR programming method of viewer marked events using TV event marking system of FIG. 1.

In yet another embodiment, FIG. 8 illustrates an automated VCR programming method 400 using TV event marking system of FIG. 1 to access an on-line broadcast event listing in database 40 to allow viewer to bookmark scheduled broadcast events or websites for automated VCR recording. Automated programming method 400 comprises a first step 402 of accessing database 40 through on-line service 60 to view scheduled broadcast events. Then, in step 404, viewer identifies the set of broadcast events to be recorded. Once selection is complete, database 40 then generates in step 406, a corresponding custom schedule identifying selected the date, time and channel of all selected broadcast events to be recorded. Then, in step 408, the custom schedule is downloaded to custom command table 206 in memory storage 202 of network access device 21. The custom schedule is then executed by CPU 216 in network access device 21 in a time-based sequence in step 410 to instruct the VCR to automatically record a particular channel at a pre-determined time.

Figure 9:
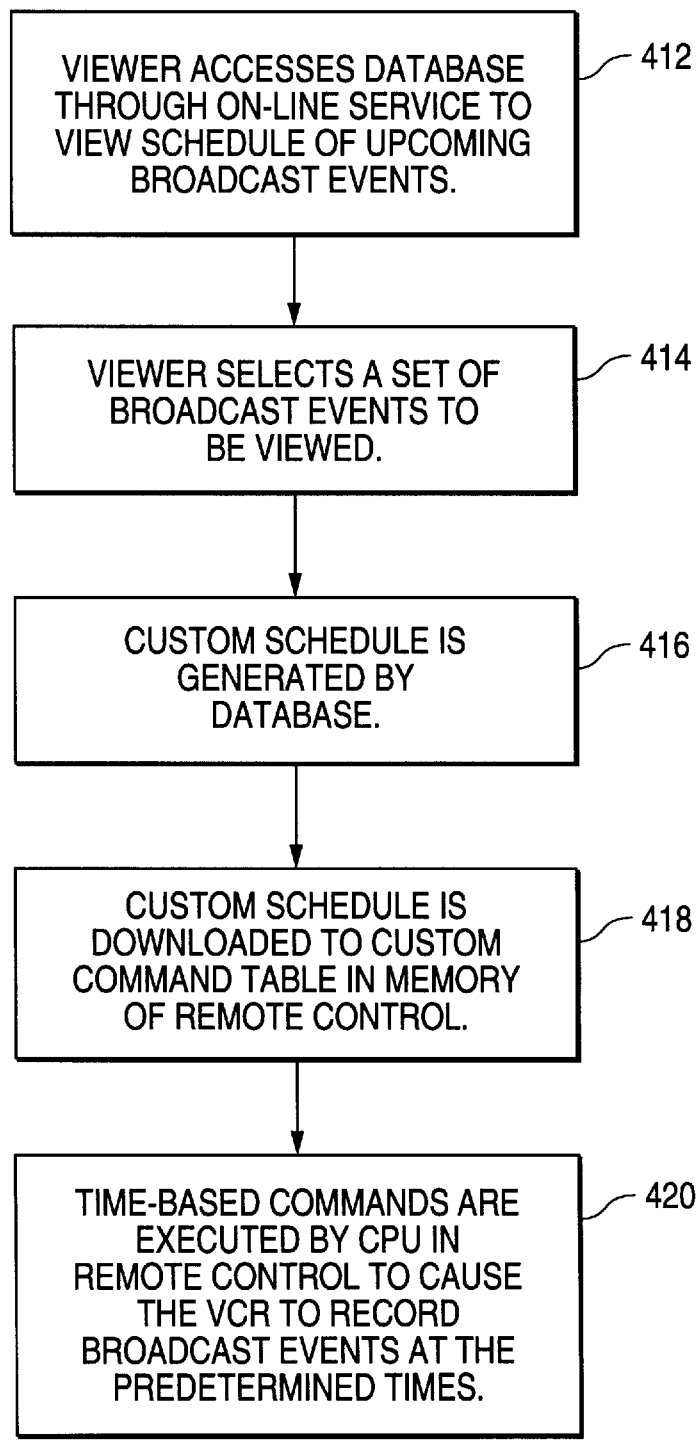
FIG. 9 illustrates an alternative embodiment of the automated VCR programming method of viewer marked events using TV event marking system of FIG. 4.

Shown in FIG. 9 is an alternative embodiment of automated VCR programming method 430 using TV event marking system of FIG. 4 comprising a first step 412 of accessing database 40 to view scheduled broadcast events. Then, in step 414, viewer selects the set of broadcast events to be recorded and viewed. Once the selection is complete, a corresponding custom schedule identifying selected the date, time and channel of all selected broadcast events is thereby generated in step 406. Then, in step 409, the custom schedule is downloaded to custom command table 206 in remote control 10 (see FIG. 5) via personal computer device 20. The custom schedule is then executed in step 420 by CPU 218 of remote control 10 in a time-based sequence so to instruct the VCR to automatically record a particular channel at a pre-determined time.

It is also envisioned as within the principles and scope of this invention to provide a method and means to develop viewer data patterns by uploading a plurality of AT 204 from multiple viewers. As described above, since it is envisioned that viewer channel selection can be stored as an AR entry in AT 204 each time the viewer makes a channel selection, activity table 204 can be uploaded from each viewer to identify patterns of TV viewing, such as, but not limited to, frequency of viewing of particular channels, broadcast events, volume patterns and other events and patterns.

Examples of the method and means to record and display viewer selected events and associated internet locations or website hotlinks are described herein in accordance with the principles of this invention. However, variations in embodiments of the principles of this invention are contemplated as within the scope of this invention and are thus also considered as taught by this invention.

We claim:

1. A method for marking and recording viewer-selected TV broadcast events comprising the steps of:

selecting a set of broadcast events using a remote control, wherein the step of selecting a set of broadcast events comprises;
      activating by a viewer an event select button on the remote control; and
      detecting in response to the viewer activating the event select button an associated date and time data from a real time clock circuit and an associated channel data from a channel register corresponding to the selected event; and
   storing a set of event-identifiers associated with the set of selected broadcast events, comprising storing the detected date and time data and the detected channel data as an activity record in an activity table.

2. The method of recording viewer selected broadcast events of claim 1 further comprising a viewer activating a direct network access button on the remote control for providing network access to an associated network location corresponding to viewer selected event the step of activating network access comprising downloading the stored activity table from the remote control to a network accessing device.

3. The method of recording viewer selected broadcast events of claim 2 wherein the network access device comprises a personal computer having network access interface, and the step of activating network access further comprises providing the stored activity table to a remote database via the personal computer, and transmitting in response thereto, a network address of an associated website correlating to viewer's selection from the database to the personal computer.

4. A system for recording viewer selected TV broadcast events and displaying a corresponding set of associated internet locations comprising:

a television for broadcasting a series of television events; and
   a remote control for controlling the television, the remote control comprising an event selection button to allow a viewer to mark a set of selected broadcast events the event selection button coupled to a channel register to read channel data and a clock circuit to access a date and time data associated with each selected event; and
   a network accessing unit, wherein the network accessing unit having an activity table comprising event identifying data generated in response to the activation of the event selection button and transmits the activity table to an online central database for generating a set of internet locations associated with the set of selected broadcast events.

5. The system of recording viewer-selected broadcast events of claim 4 wherein the remote control further comprises a network access button to allow a viewer direct access to and for displaying websites of selected event.

6. The system of recording viewer-selected broadcast events of claim 4 wherein the remote control further comprises an upload function button to provide a transmission of the activity table from remote control to a network access unit.

7. A method for recording viewer selected TV broadcast events and displaying an associated set of internet locations comprising:

selecting by a viewer a set of broadcast events using a remote control;
   storing in response to each viewer activation of an event select button on the remote control an activity record comprising a date and time data from a clock circuit and a channel data from a channel register, each activity record stored into an activity table associated with the set of selected broadcast events;
   transmitting the activity table through a network access unit to a central database on the net; and
   generating a set of internet locations and website hotlinks in response to each activity entry correlating to events identified by the activity table, wherein the set of internet locations and website hotlinks can be used by the viewer to access and display selected internet locations.

8. The method for recording viewer selected TV broadcast events of claim 7 wherein the network access unit comprises a personal computer.

9. The method for recording viewer selected TV broadcast events of claim 7 wherein the network access unit comprises a set top box.

10. A method for marking and recording listener-selected radio broadcast events comprising the steps of:

selecting a set of broadcast events using a remote control, wherein the step of selecting a set of broadcast events comprises;
      activating by a listener an event select button on the remote control; and
      detecting in response to the listener activating the event select button an associated date and time data from a real time clock circuit and an associated channel data from a channel register corresponding to the selected event; and
   storing a set of event-identifiers associated with the set of selected broadcast events, comprising storing the detected date and time data and the detected channel data as an activity record in an activity table.

\* \* \* \* \*